US012711084B2

(12) United States Patent
Kuehlwein et al.

(10) Patent No.: US 12,711,084 B2
(45) Date of Patent: Aug. 18, 2026

(54) ELECTROMECHANICAL SWITCHES ON INPUT/OUTPUT (I/O) COMPONENTS

(71) Applicant: Micron Technology, Inc., Boise, ID (US)

(72) Inventors: Jeremy Kuehlwein, Woodbury, MN (US); Neil Petrie, St. Louis Park, MN (US); Ming-ta Hsieh, Woodbury, MN (US); Gregory A. King, Mankato, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/767,645

(22) Filed: Jul. 9, 2024

(65) Prior Publication Data

US 2025/0021501 A1 Jan. 16, 2025

Related U.S. Application Data

(60) Provisional application No. 63/526,862, filed on Jul. 14, 2023.

(51) Int. Cl.

| | |
|---|---|
| ***G06F 13/24*** | (2006.01) |
| ***H01H 1/00*** | (2006.01) |
| ***H02H 9/04*** | (2006.01) |

(52) U.S. Cl.

CPC ........... *G06F 13/24* (2013.01); *H01H 1/0036* (2013.01); *H02H 9/045* (2013.01); *G06F 2213/24* (2013.01)

(58) Field of Classification Search

CPC .. G06F 11/3027; G06F 11/3062; G06F 13/40; G06F 2212/1028; H03K 19/018592; H03K 5/2472

See application file for complete search history.

(56) References Cited

U.S. PATENT DOCUMENTS 6,307,169 B1 10/2001 Sun et al.
6,526,466 B1 * 2/2003 Frake .................. G06F 13/4081 327/530
2004/0203472 A1 * 10/2004 Chien ................. H04L 27/0014 455/67.11
2004/0218423 A1 * 11/2004 Lee ...................... G11C 7/1066 365/233.14
2007/0236307 A1 10/2007 Liu
2009/0267678 A1 * 10/2009 Bilger ................. H04L 25/0278 327/382
2015/0140937 A1 * 5/2015 Story .................. H04W 52/028 455/78
2015/0180465 A1 * 6/2015 Na ..................... H03K 17/6871 327/382
2021/0135326 A1 * 5/2021 Puente ................... H03K 17/76
2024/0071694 A1 * 2/2024 Ariturk ..................... H01P 1/12

* cited by examiner

*Primary Examiner* — Phong H Dang
(74) *Attorney, Agent, or Firm* — Brooks, Cameron & Huebsch, PLLC

(57) ABSTRACT

Input/output (I/O) components can include electromechanical switches that can be placed respectively on signal lines coupled between transceivers and I/O pads. Electromechanical switches can operate to isolate respective transceivers from the other transceivers and/or I/O pads to protect those transceivers from ESD events. Electromechanical switches of I/O components can be micro-electromechanical systems (MEMS) switches.

15 Claims, 4 Drawing Sheets

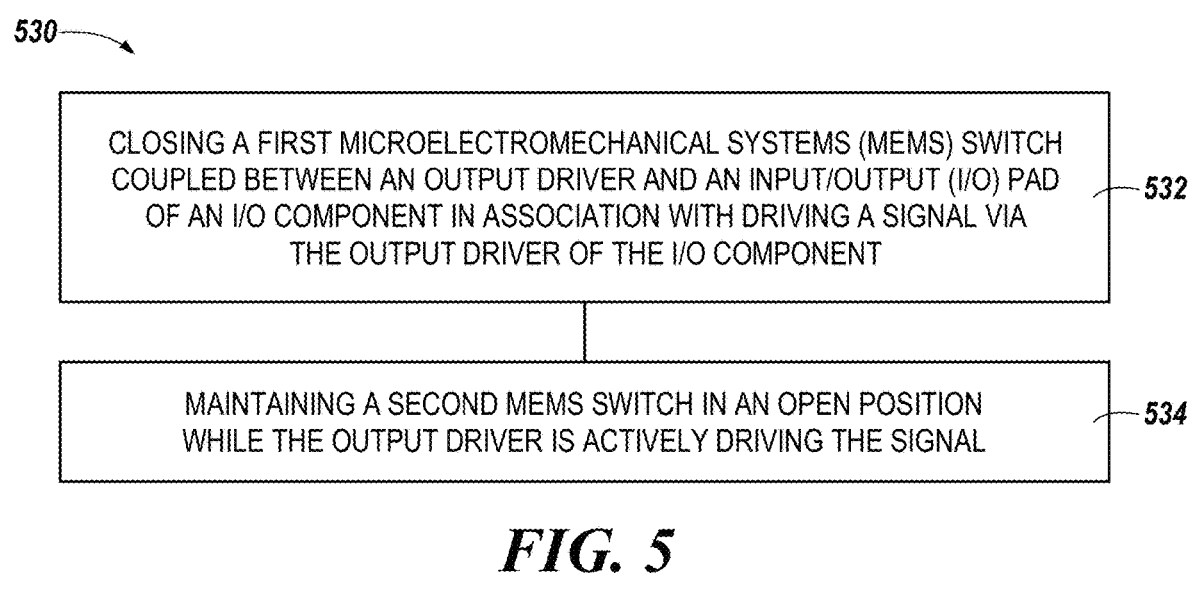

530

CLOSING A FIRST MICROELECTROMECHANICAL SYSTEMS (MEMS) SWITCH COUPLED BETWEEN AN OUTPUT DRIVER AND AN INPUT/OUTPUT (I/O) PAD OF AN I/O COMPONENT IN ASSOCIATION WITH DRIVING A SIGNAL VIA THE OUTPUT DRIVER OF THE I/O COMPONENT — 532

MAINTAINING A SECOND MEMS SWITCH IN AN OPEN POSITION WHILE THE OUTPUT DRIVER IS ACTIVELY DRIVING THE SIGNAL — 534

*FIG. 5*

ELECTROMECHANICAL SWITCHES ON INPUT/OUTPUT (I/O) COMPONENTS

PRIORITY INFORMATION

This application claims the benefit of U.S. Provisional Application No. 63/526,862, filed on Jul. 14, 2023, the contents of which are incorporated herein by reference.

TECHNICAL FIELD

The present disclosure relates generally to semiconductor memory and methods, and more particularly, to apparatuses, systems, and methods for electromechanical switches on I/O components.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random-access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 5 is a flow diagram of a method for controlling electromechanical switches on I/O components in accordance with a number of embodiments of the present disclosure.

DETAILED DESCRIPTION

Figure 1:
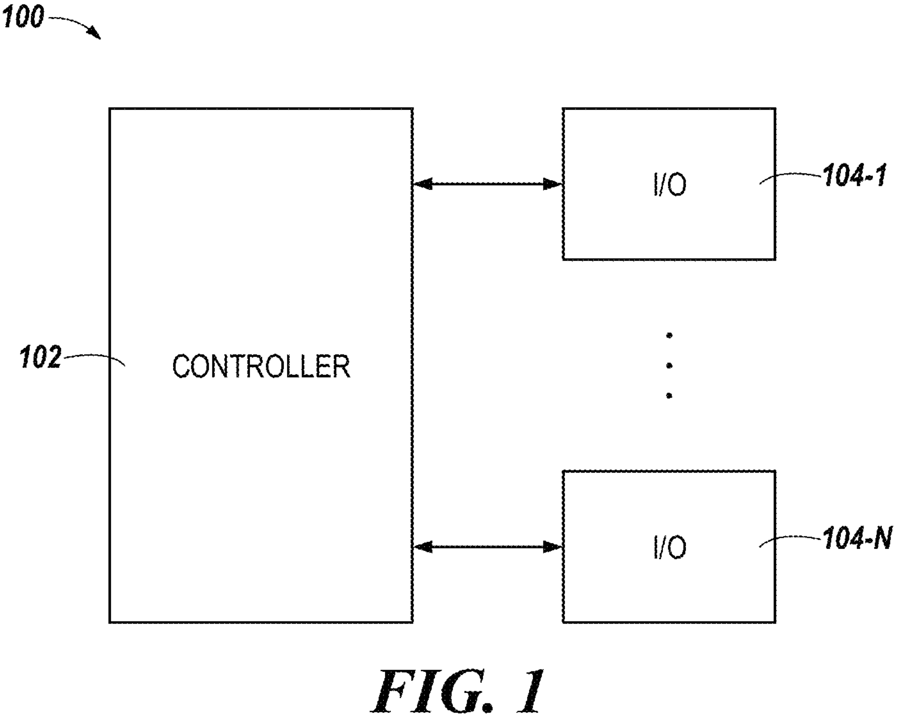
FIG. 1 is a block diagram of an apparatus in the form of a computing system including a controller and input/output (I/O) components in accordance with a number of embodiments of the present disclosure.

Systems, apparatuses, and methods related to electromechanical switches on I/O components are described. I/O circuits can include one or more signal lines for transmitting signals in one or more directions. Those I/O circuits that are capable of transmitting signals in one direction are referred to as "unidirectional" I/O circuits, while those I/O circuits that are capable of transmitting signals in two (e.g., opposite) directions are referred to as "bidirectional" I/O circuits. I/O circuits can include various parts, such as I/O pad, transceivers that may be coupled to each other and to the I/O pad, etc. I/O circuits can be implemented in various components of memory systems, including, but not limited to, controllers, buffers, ports, interfaces, etc.

Transceivers can include transmitters and receivers. As used herein, the term "transmitter" can be alternatively referred to as "transmit driver", "output driver", etc. Further, the term "receiver" can be alternatively referred to as "receiver driver", "input driver", etc. A transmitter as an output driver can drive a signal (e.g., received externally) to an I/O pad and a receiver as an input driver can drive a signal received from the I/O pad.

Electrostatic discharge (ESD) refers to the sudden flow of electricity between two electrically charged objects (e.g., electrical components, circuits, etc.) caused by direct contact or proximity. For example, ESD can occur among those constituent parts of I/O components, such as among transceivers, I/O pads, etc. that are coupled to each other via physical signal lines; thereby, causing significant damage to the I/O components. To protect against ESD, I/O components can be implemented with particular circuits (referred to herein as "ESD protection circuits") specifically designed to provide ESD protection. These ESD protection circuits can operate to limit the voltage of the ESD event to a level that the electrical components and/or circuits can withstand, thus preventing damage from ESD events.

In some approaches, ESD protection circuits are placed between I/O pads and transceivers to provide ESD protection on respective transceivers against ESD events occurred from I/O pads. However, they may not fully shield the transceivers from ESD that occurs while I/O circuits are being manufactured (e.g., constituent circuits of the I/O circuits are being assembled). Further, the incorporation of ESD protection circuits into I/O circuits may significantly increase their size and power consumption and degrade the performance of I/O circuits.

Aspects of the present disclosure address the above and other challenges associated with providing ESD protection to I/O circuits. Instead of separate ESD protection circuits, I/O circuits (alternatively referred to as "I/O components" herein) can be provided electromechanical switches that can be placed on those signal lines coupled to transceivers of I/O components, which can isolate each transceiver not only from I/O pads, but also from the other transceivers. Transceivers that are "active" (e.g., actively driving signals) and isolated from the other "inactive" transceivers can improve their performance (e.g., performance of "active" transceivers, such as data transfer bandwidth) by preventing interference from electrical loads generated by the other "inactive" transceivers.

The isolation provided by these electromechanical switches can be sufficient to eliminate the need for separate ESD protection circuits; thereby, reducing the volume of I/O components. Electromechanical switches described in the present disclosure can be microelectromechanical systems (MEMS) switches. MEMS switches can include mechanical parts that can "physically" move in response to electrical signals, allowing them to open or close. Accordingly, signal lines that can be connected via MEMS switches can be "physically" disconnected, which can provide more complete isolation of the transceiver components (e.g., transmit driver and/or receive driver) by preventing unwanted signals or interference from passing through, as compared to relying on mere electrical disconnection such as via CMOS transistors, for example.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3.

Analogous elements within a Figure may be referenced with a hyphen and extra numeral or letter. See, for example, elements 104-1, . . . , 104-N in FIG. 1. Such analogous elements may be generally referenced without the hyphen and extra numeral or letter. For example, elements 104-1, . . . , 104-N may be collectively referenced as 104. As used herein, the designators "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a portion of a computing system 100 including a controller 102 and input/output (I/O) components 104-1, . . . , 104-N (collectively referred to as "I/Os 104") in accordance with a number of embodiments of the present disclosure. As used herein, a controller 102 and I/Os 104 might also be separately considered an "apparatus."

The I/Os 104 can include various circuitry to facilitate transmission of signals between electrical components (e.g., chips). For example, as further illustrated in FIG. 3, I/Os 104 can include one or more signal lines, transceivers (e.g., transmitter, receiver, etc.), I/O pads, etc. that can receive an external signal (e.g., signal received from an external device, such as controller 102) and/or output the received signal (e.g., to the controller 102). Although embodiments are not so limited, an I/O 104 can be a bidirectional I/O that can transmit/receive signals from/to an I/O pad.

Although embodiments are not so limited, I/Os 104 can form various buses (e.g., data buses, address buses, command buses, etc.) and can be placed in various locations of the computing system. For example, I/O components can be placed among peripheral devices (e.g., sensors, actuators, displays, etc.), a host (e.g., a desktop computer, laptop computer, network server, mobile device, or such computing device that includes a memory and a processing device), storage system (e.g., including memory dice) etc. of the computing system.

In some embodiments, one or more of I/Os 104 can be part of (e.g., form) a "port", which may be a physical port, such as serial advanced technology attachment (SATA) ports, peripheral component interconnect express (PCIe) ports, universal serial bus (USB) ports, Fibre Channel ports, Small Computer System Interface (SCSI) ports, Serial Attached SCSI (SAS) ports, a dual in-line memory module (DIMM) ports, an NVM Express (NVMe) ports, Open NAND Flash Interface (ONFI) ports, etc. Further, in some embodiments, I/Os 104 can be (e.g., integrated) part of the controller 102 instead of being separate components independently of the controller 102.

As illustrated in FIG. 1, I/Os 104 include electromechanical switches 108 that can be respectively (e.g., placed on signal lines) coupled to transceivers of I/Os 104. Electromechanical switches 108 can be MEMS switches.

The controller 102 can include various circuitry to facilitate an operation described herein, such as controlling various parts of the I/Os 104. For example, the controller 102 can include special purpose circuitry in the form of an ASIC, FPGA, state machine, and/or other logic circuitry or software and/or firmware that can allow the controller 102 to control parts of the I/Os 104, such as electromechanical switches 108.

In some embodiments, the controller 102 can be a device (e.g., testing equipment) that can control parts (e.g., electromechanical switches 108) of the I/Os 104 during manufacturing and testing phases. In some embodiments, the controller 102 can be a device (e.g., of a computing device) that can control parts (e.g., electromechanical switches 108) of the I/Os 104 during operation of the computing device. For example, the controller 102 can provide signals to I/Os 104 to configure I/Os to receive signals or transmit signals received thereto to an external circuit (e.g., off-chip), which can be done by selectively enabling/disabling electromechanical switches 108 of I/Os 104. As used herein, "opening" and/or placing switches in an open position refers to "disabling" electromechanical switches, while "closing" and/or placing switches in a "closed" position refers to "enabling" electromechanical switches. Those switches that are in an "open" position disconnects signals lines on which switches are placed, while those switches that are in a "closed" position connect signal lines on which switches are placed.

As described herein, MEMS switches can include mechanical parts that can "physically" move to be in a closed or open position, which can eventually disconnects signals lines "physically". As signal lines are "physically" disconnected, parts (e.g., transceivers 305, 307 and/or I/O pad 306 illustrated in FIG. 3) of I/Os can be more safely protected from ESD events that would have occurred from the other parts (e.g., the other transceivers, I/O pad, etc.) that are "physically" disconnected from the parts being protected.

I/Os 104 can be "hot plugged" or "hot swapped". As used herein, the term "hot plugging" or "hot swapping" refers to the capability of being added and/or removed to the computing device/system (e.g., system 100) during operation of the computing device/system. For example, the controller 102 can dynamically control electromechanical switches 108 (e.g., while the system 100 is in operation) to disconnect those signal lines of an I/O 104 that are to be "hot plugged" or "hot swapped", which can reduce and/or prevent ESD damages to parts (e.g., transceivers 305, 307) of the I/O 104 while the I/O 104 is being "hot plugged" or "hot swapped". The controller 102 can further control electromechanical switches 108 (e.g., to place the switches 108 in an open or closed position) during manufacturing (e.g., assembly) phases and/or operation of computing systems to protect I/Os 104 from ESD events. Further details of controlling electromechanical switches 108 are described in connection with FIGS. 3 and 4).

Figure 2:
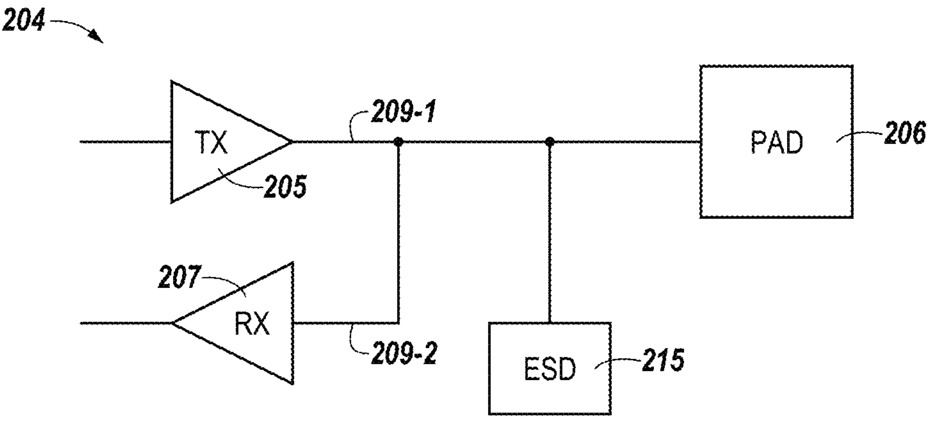
FIG. 2 is a block diagram illustrating an example I/O component in some approaches.

FIG. 2 is a block diagram illustrating an example I/O component in some approaches. As illustrated in FIG. 2, the I/O component 204 includes a first transceiver (e.g., a transmitter 205 shown as "TX" in FIG. 2), a second transceiver (e.g., a receiver 207 shown as "RX" in FIG. 2), and an I/O pad 206 (shown as "PAD" in FIG. 2. The transmitter 205 is coupled to the I/O pad 206 via a signal line 209-1, while the receiver 207 is coupled to the I/O pad 206 via a signal line 209-2.

The I/O component 204 further includes ESD protection circuit 215 coupled between respective transceivers 205 and 207 and the I/O pad 206. The ESD protection circuit can include ESD protection diodes or transient voltage suppression (TSV) diodes. Although the ESD protection circuit 215 can protect transceivers 205 and 207 from electrical load originated from the I/O pad 206, it may not offer the same protection for each transceiver 205, 207 from ESD events that may occur while an I/O component 204 is being manufactured (e.g., while a transmitter 205, a receiver 207, an ESD protection circuit 215, a pad 206, etc. are being assembled), which can leave I/O component 204 still vulnerable to damages from ESD events in the manufacturing and/or assembly phases.

Figure 3:
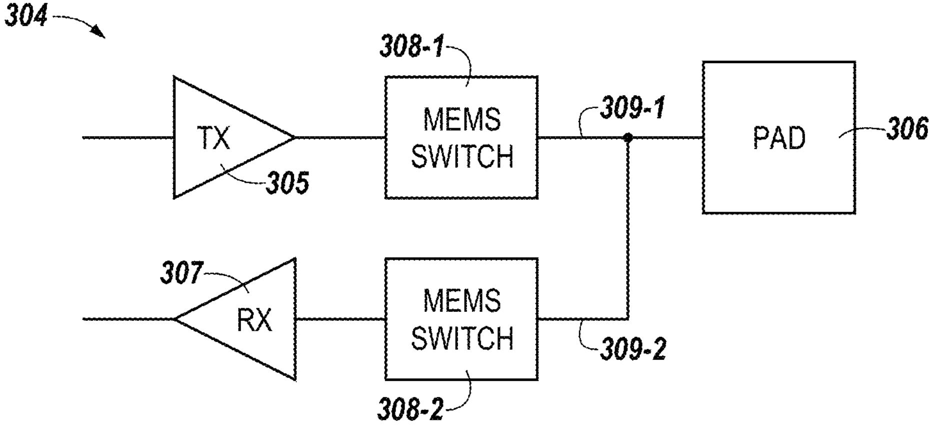
FIG. 3 is a block diagram illustrating an example I/O component in accordance with a number of embodiments of the present disclosure.

FIG. 3 is a block diagram illustrating an example I/O component 304 in accordance with a number of embodiments of the present disclosure. The I/O component 304 can be analogous to the I/O components 104 illustrated in FIG. 1.

As illustrated in FIG. 3, the I/O component 304 includes a first transceiver (e.g., a transmitter 305 shown as "TX" in FIG. 3), a second transceiver (e.g., a receiver 307 shown as "RX" in FIG. 3), and an I/O pad 306 (shown as "PAD" in FIG. 3). The transmitter 305 is coupled to the I/O pad 306 via a signal line 309-1, while the receiver 307 is coupled to the I/O pad 306 via a signal line 309-2. As used herein, the term "transmitter" can be alternatively referred to as "transmit driver", "output driver", etc. Further, the term "receiver" can be alternatively referred to as "receiver driver", "input driver", etc. As illustrated in FIG. 3, the transmitter 305 as an output driver is operable to drive a signal (e.g., received externally) to an I/O pad (e.g., I/O pad 306) and while the receiver 307 as an input driver is operable to drive a signal received from the I/O pad, such as I/O pad 306.

The I/O component 304 further includes electromechanical switches 308-1 and 308-2 (e.g., MEMS switches) placed on signal lines 309-1 and 309-2, respectively. As described herein, electromechanical switches 308-1 and 308-2 can be MEMS switches. Further, electromechanical switches 308-1 and 308-2 can be enabled (e.g., placed in a closed position) or disabled (e.g., placed in an open position) as controlled by the controller (e.g., the controller 102 illustrated in FIG. 1). Electromechanical switches 308-1 and 308-2 can be operable to electrically and physically isolate respective transceivers 305 and 307 when electromechanical switches 308-1 and 308-2 are placed in an open position. As opposed to ESD protection circuit 215 that only provides electrical isolation, isolation provided by MEMS switches 308-1 and 308-2 is not only electrical, but also physical that can be sufficient to eliminate the need for separate electrostatic discharge (ESD) protection circuit on I/O 304. Accordingly, the I/O component 304 does not include separate ESD protection circuits.

During operation of the I/O component 304, the controller 102 can disable transceivers 305 and 307 when they are not in use. In one example, the transceivers 305 and 307 can be disabled during manufacturing phases (e.g., assembly phases) and/or when the I/O component 304 is not in use (e.g., such that both transceivers 305 and 307 are not required to actively drive signals) to isolate both the transmitter 305 and receiver 307 from each other as well as from the I/O pad 306.

When the transmitter 305 is desired to be used (e.g., to drive a signal from the transmitter 305 to the I/O pad 306), the controller 102 can disable the MEMS switch 308-2 to disconnect the signal line 309-2 and enable the MEMS switch 308-1 to connect the signal line 309-1. In this example, when the transmitter 305 is actively driving the signal, the transmitter 305 can be isolated (e.g., not only electrically, but also physically) from the receiver 307; thereby, preventing interference from electrical loads generated by the receiver 307 and improving the performance of the transmitter 305.

Vice versa, when the receiver 307 is desired to be used (e.g., to drive a signal from the I/O pad 306 to the receiver 307), the controller 102 can disable the MEMS switch 308-1 to disconnect the signal line 309-1 and enable the MEMS switch 308-2 to connect the signal line 309-2. In this example, when the receiver 307 is actively driving the signal, the receiver 307 can be isolated (e.g., not only electrically, but also physically) from the transmitter 305; thereby, preventing interference from electrical loads generated by the transmitter 305 and improving the performance of the receiver 307.

Figure 4:
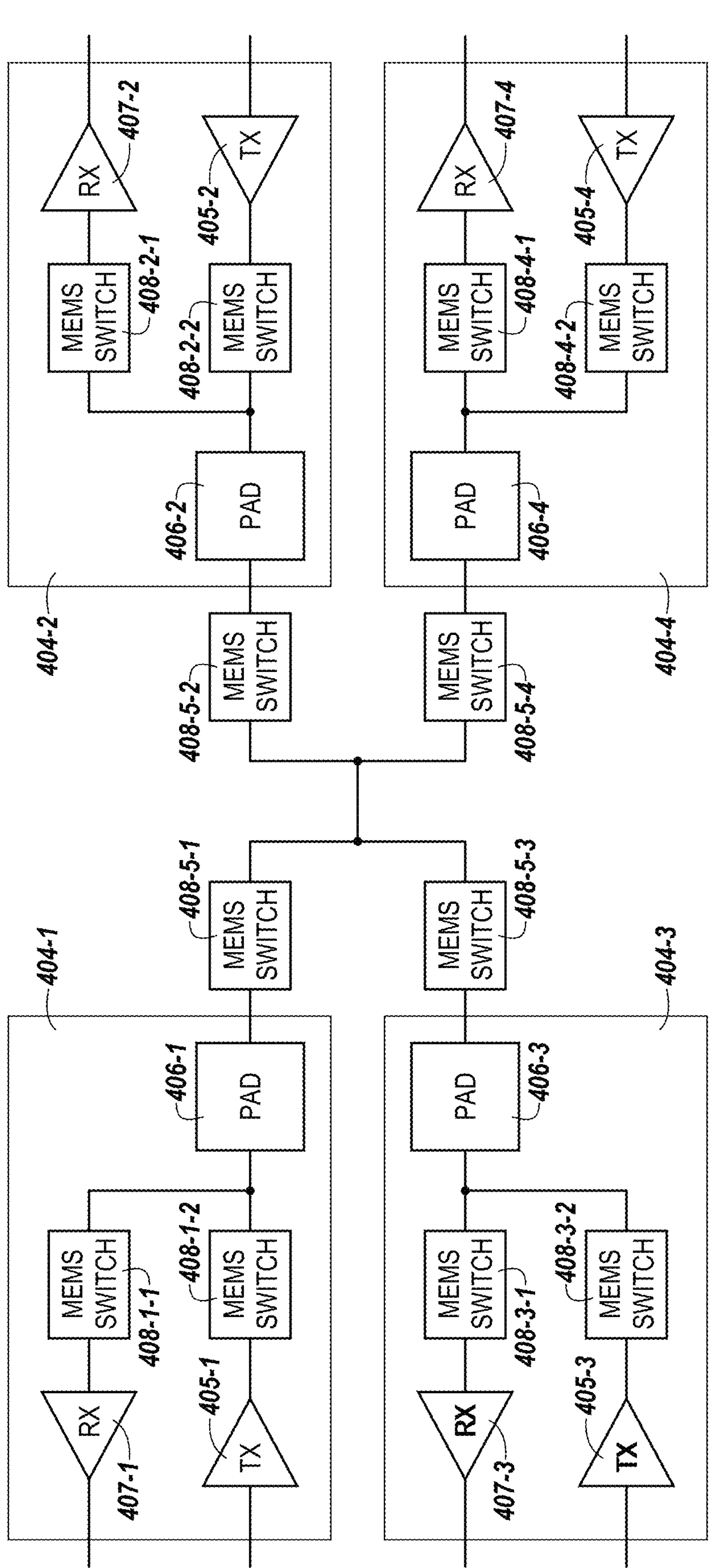
FIG. 4 is a block diagram illustrating another example I/O component in accordance with a number of embodiments of the present disclosure.

FIG. 4 is a block diagram illustrating another example I/O component 404-1, . . . , 404-4 (collectively referred to as I/O components 404) in accordance with a number of embodiments of the present disclosure. Each I/O component 404 illustrated in FIG. 4 is analogous to the I/O components 104 and/or 304 illustrated in FIGS. 1 and 3, respectively.

As illustrated in FIG. 4, I/O components 404 can be coupled to one another via MEMS switches 408-5-1, . . . , 408-5-4 (collectively referred to as MEMS switches 408-5). As illustrated in FIG. 4, for example, an I/O component 404-1 is coupled to the other I/O components 404 via a MEMS switch 408-5-1; an I/O component 404-2 is coupled to the other I/O components 404 via a MEMS switch 408-5-2; an I/O component 404-3 is coupled to the other I/O components 404 via a MEMS switch 408-5-3; and an I/O component 404-4 is coupled to the other I/O components 404 via a MEMS switch 408-5-4.

In a configuration illustrated in FIG. 4, each I/O component 404 can be considered and referred to as "channel". I/O components 404 as channels can be connected to one another to allow a signal from (e.g., a pad 406 of) one IO component 404 to be broadcast to other/multiple I/O components 404. MEMS switches 408-5 can functionally operate as multiplexors (MUX) and/or demultiplexors (DeMUX) to selectively connect one I/O component 404 to another I/O component 404. In one example, MEMS switches 408-5-1, . . . , 408-5-4 can be placed in a closed position to allow I/O components 404-1, . . . , 404-4 to be connected to one another such that a signal from one I/O component 404 can be broadcast to other/multiple I/O components 404.

In another example, if an I/O component 404-1 is not (e.g., desirable to be) in use, while I/O components 404-2, 404-3, and 404-4 are (e.g., desirable to be) in use, MEMS switches 408-5-2, 408-5-3, and 408-5-4 can be placed in an open position, while a MEMS switch 408-5-1 is placed in an open position. This (e.g., placing a respective MEMS switch 408-5-1 in an open position) isolates the other channels (corresponding to I/O components 404-2, 404-3, and 404-4) from capacitive loading (e.g., including the pad capacitance from the pad 406-1 of) from the channel (corresponding to the I/O component 404-1) and reduces capacitive loading from the I/O components 404-1; thereby improving high bandwidth performance of the I/O components 404 that are in use.

FIG. 5 is a flow diagram 530 of a method for controlling electromechanical switches on I/O components in accordance with a number of embodiments of the present disclosure. The method as illustrated by the flow diagram 530 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by controller 102 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 532, a first MEMS switch (e.g., a MEMS switch 308-1 illustrated in FIG. 3) that is coupled between an output driver (e.g., transmitter 305 illustrated in FIG. 3) and an I/O pad (e.g., I/O pad 306 illustrated in FIG. 3) can be closed (e.g., placed in a closed position) in association with driving a signal via an output driver (e.g., output driver 305 illustrated in FIG. 3) of an I/O component (e.g., I/O 104, 304 illustrated in FIGS. 1 and 3). At 534, a second MEMS switch (e.g., a MEMS switch 308-2 illustrated in FIG. 3) that is coupled between an input driver (e.g., receiver 307 illustrated in FIG. 3) and the I/O pad 306 can be maintained in an open position to isolate the input driver 307 from the output driver 305 and the I/O pad 306 while the output driver 305 is actively driving a signal.

Alternatively, the second MEMS switch 308-2 can be closed (e.g., placed in a closed position) in association with driving the signal via the input driver 307 to drive a signal. In this example (while the input driver 307 is actively driving the signal), the first MEMS switch 308-1 can be maintained in an open position to isolate the output driver 305 from the I/O pad 306.

In some embodiments, the first and second MEMS switches 308-1 and 308-2 can be opened, while the input and output drivers (e.g., the input driver 307 and the output driver 305) are not actively driving a signal. In some embodiments, the first and the second MEMS switches 308-1 and 308-2 can be dynamically opened and closed during operation of a computing device including the I/O component 104, 304.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
an input/output (I/O) pad;
an input driver coupled to the I/O pad;
an output driver coupled to the I/O pad;
a first microelectromechanical systems (MEMS) switch coupled to the I/O pad and to the input driver; and
a second MEMS switch coupled to the I/O pad and to the output driver;
wherein:
the first MEMS switch is placed in an open position to isolate the input driver from the I/O pad when the output driver is actively driving a signal;
the second MEMS switch is placed in an open position to isolate the output driver from the I/O pad when the input driver is actively driving a signal; and
while the input and output drivers are not actively driving a signal and to isolate both the input and output drivers from the I/O pad:
the first MEMS switch is placed in the same position as the position in which the first MEMS switch is placed, while the output driver is actively driving a signal; and
the second MEMS switch is placed in the same position as the position in which the second MEMS switch is placed, while the input driver is actively driving a signal.

2. The apparatus of claim 1, wherein the apparatus comprises a bidirectional I/O component.

3. The apparatus of claim 2, wherein operation of the first MEMS switch or the second MEMS switch provides sufficient electrical isolation that the bidirectional I/O component does not include a separate electrostatic discharge (ESD) protection circuit.

4. The apparatus of claim 1, wherein the one of the input and output drivers is a receiver driver and the other of the input and output drivers is a transmit driver.

5. The apparatus of claim 1, wherein the first MEMS switch or the second MEMS switch is operable to isolate the one of the input and output drivers from the I/O pad when the first MEMS switch or the second MEMS switch is in an open position.

6. A system, comprising:
an input/output (I/O) component comprising:
an I/O pad coupled to an output driver and an input driver;
a first microelectromechanical systems (MEMS) switch coupled between the I/O pad and the output driver, the first MEMS switch operable to isolate the output driver from the I/O pad and the input driver; and a second MEMS switch coupled between the I/O pad and the input driver, the second MEMS switch operable to isolate the input driver from the I/O pad and the output driver;

a controller coupled to the I/O component; the controller configured to:

place, to isolate the output driver from the I/O pad and the input driver, the first MEMS switch in an open position, while the input driver is actively driving a signal;

place, to isolate the input driver from the I/O pad and the output driver, the second MEMS switch in an open position, while the output driver is actively driving a signal; and place, while the input and output drivers are not actively driving a signal and to isolate both the input and output drivers from the I/O pad:

the first MEMS switch in the same position as the position in which the first MEMS switch is placed, while the input driver is actively driving a signal, and the second MEMS switch in the same position as the position in which the second MEMS switch is placed, while the output driver is actively driving a signal.

7. The system of claim 6, wherein:

the output driver is operable to drive a signal to the I/O pad; and the input driver is operable to drive a signal received from the I/O pad.

8. The system of claim 6, wherein the controller is configured to place the first MEMS switch or second MEMS switch in an open or closed position during operation of the system.

9. The system of claim 6, wherein the controller is configured to place, to cause the input driver to drive a signal, the second MEMS in a closed position to couple the input driver to the I/O pad.

10. The system of claim 6, wherein the input and output drivers are coupled to the I/O pad without being coupled to an electrostatic discharge (ESD) protection circuit.

11. The system of claim 6, wherein:

the output driver corresponds to a transmitter; and the input driver corresponds to a receiver.

12. A method, comprising:

in association with driving a signal via an output driver of an input/output (I/O) component, closing a first microelectromechanical systems (MEMS) switch coupled between the output driver and an I/O pad of the I/O component; and while the output driver is actively driving the signal, maintaining a second MEMS switch in an open position, wherein the second MEMS switch is coupled between an input driver of the I/O component and the I/O pad;

placing the first MEMS switch in an open position, while the input driver is actively driving a signal;

placing the second MEMS switch in an open position, while the output driver is actively driving a signal; and placing, while the input and output drivers are not actively driving a signal:

the first MEMS switch in the same position as the position in which the first MEMS switch is placed, while the input driver is actively driving a signal, and the second MEMS switch in the same position as the position in which the second MEMS switch is placed, while the output driver is actively driving a signal.

13. The method of claim 12, further comprising, in association with driving a signal via the input driver, placing the second MEMS switch in a closed position.

14. The method of claim 13, further comprising, while the input driver is actively driving the signal, maintaining the first MEMS switch in an open position to isolate the output driver from the I/O pad.

15. The method of claim 12, further comprising dynamically placing the first and the second MEMS switches in an open position and a closed position during operation of a computing device including the I/O component.

* * * * *